Dec. 17, 1968  F. MENKE  3,417,314
APPARATUS FOR GENERATING HIGH VOLTAGES
Filed July 23, 1962
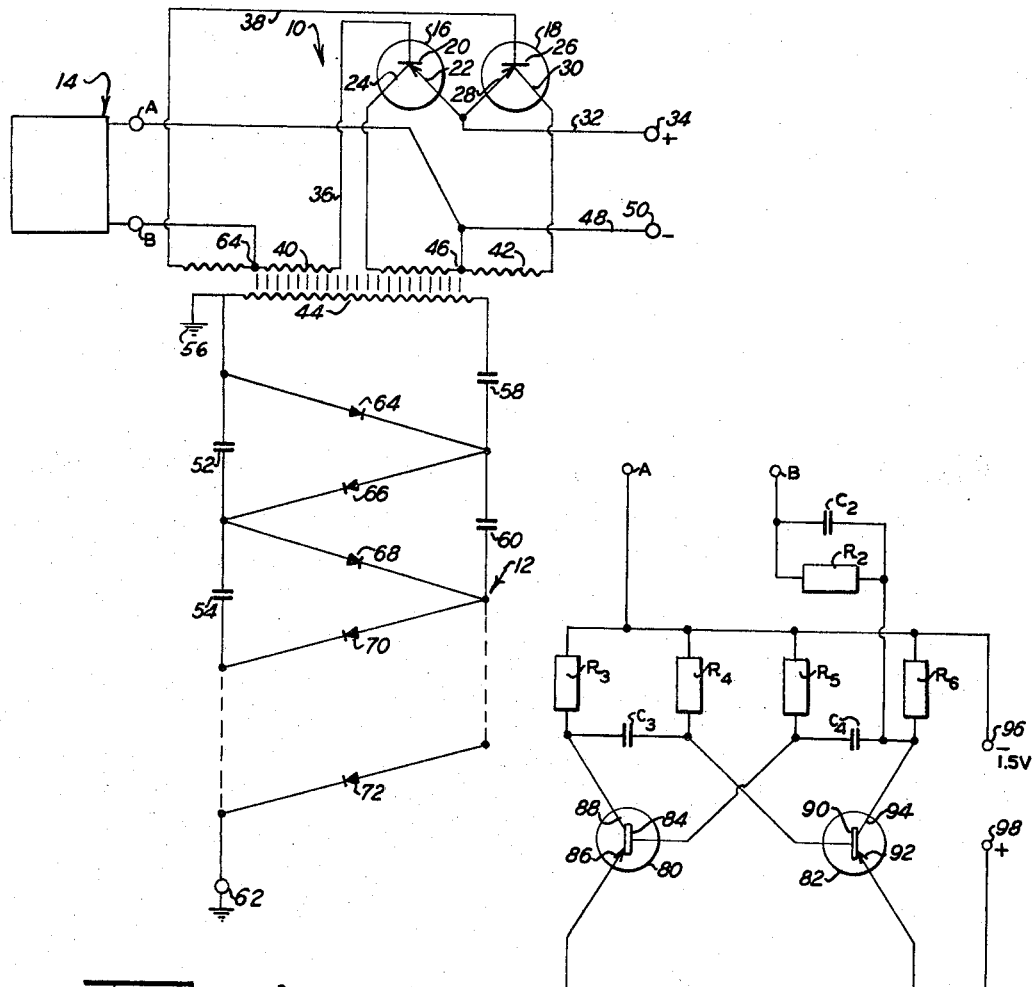
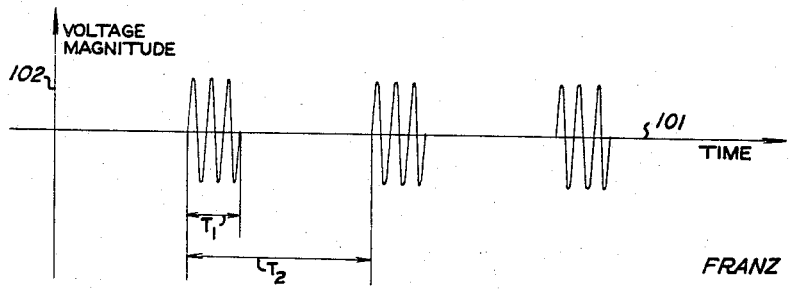
INVENTOR
FRANZ MENKE United States Patent Office 3,417,314
Patented Dec. 17, 1968

3,417,314
APPARATUS FOR GENERATING HIGH
VOLTAGES
Franz Menke, Neckargemund, Heidelberg, Germany,
assignor to Eltro G.m.b.H. & Co., Heidelberg, Germany
Filed July 23, 1962, Ser. No. 211,743
Claims priority, application Germany, July 22, 1961,
E 21,418
1 Claim. (Cl. 321—44)

This invention relates to apparatus for generating high voltages.

High-voltage generators are often required, which deliver high magnitude D.C. voltages, but which are subjected only to very low power loads. This is, for example, the case in the operation of television picture tubes, cathode ray oscillograph tubes or image converter tubes. Portable instruments of this kind use drycell batteries, accumulators or storage cells as sources of energy.

It is important for many uses that the high-voltage generator including a direct-current potential source (e.g. battery) have the smallest possible dimensions and the lowest possible weight. These requirements are fulfilled in known miniature high-voltage generators by the use of an electric oscillator, which feeds, by way of an oscillating transformer, a rectifying voltage multiplier such as, for example, a Greinacher cascade. In order to obtain small dimensions, transistorized oscillators and cascades provided with semi-conductor rectifiers are used.

It is known that the battery contributes substantially to the volume and weight of the associated high-voltage generator. If, for the above-mentioned reasons, a small battery is used, e.g., a monocell with a voltage of 1.5 volts, it is especially important to see to it that the high-voltage generator has a good efficiency so that sufficient life is obtained despite the small capacity of the battery.

If a normal transistorized push-pull oscillator is operated with a low battery voltage (for example, 1.5 v.), the ratio of residual voltage to the battery voltage is comparatively high. It is apparent from the properties of transistors that the oscillator operates with good efficiency if the oscillating current is high, and with poor efficiency if the oscillating current is small. At the high ratio of residual voltage to battery voltage, as determined by the low battery voltage, and at the low power output as required by the output current of the D.C.-converter, it is not possible to obtain an oscillating current which is sufficiently high to insure good efficiency.

The present invention overcomes this disadvantage in that an oscillator of a D.C.-converter of the above-described kind is operated with high oscillating current, i.e., with favorable efficiency, and the oscillations are interrupted periodically.

In accordance with the invention there is provided a direct-current converter comprising an oscillator comprising first and second transistors each having an emitter, a collector and a base, a transformer including first and second center-tapped windings and an output winding, a direct-current potential source including first and second terminals, means for connecting said emitters to said first terminal, means for connecting said collectors respectively to the ends of said first center-tapped winding, means for connecting said bases respectively to the ends of said second center-tapped winding, means for connecting the center tap of said first winding and the center tap of said second winding to said second terminal; a gating current control means connected between the center taps of said first and second windings for controlling the voltage applied to said bases, said gating means including an astable multivibrator; and a rectifier means connected to said output winding.

The invention will be more clearly understood from the following detailed description of some preferred embodiments as illustrated in the accompanying drawings in which:

FIGURE 1 illustrates a D.C.-converter provided in accordance with the invention;
FIGURE 2 is a graph illustrating the technique contemplated in accordance with the invention; and
FIGURE 3 illustrates a unit to be employed as the gating means in the circuit of FIGURE 1.

In FIG. 1 is shown an oscillating means 10, a rectifying means 12 and a gating means 14. Oscillating means 10 comprises transistors 16 and 18, the transistor 18 comprising a base 20 and emitter 22 and a collector 24. Transistor 18 comprises a base 26 and emitter 28 and a collector 30.

The emitters 22 and 28 are connected via a line 32 to a terminal 34 which is the positive terminal of a 1.5 volt battery. Bases 20 and 26 are connected via lines 36 and 38 to the opposite extremities of a winding 40 of a magnetically saturable transformer compromising a further winding 42 to the extremities of which are connected collectors 24 and 30. The aforesaid transformer also comprises a winding 44 operatively associated with the aforesaid windings 40 and 42.

A center tap 46 of winding 42 is connected via line 48 to terminal 50 which is the negative terminal of the aforesaid 1.5 volt battery.

The rectifying means 12 which is preferably a voltage multiplier circuit of the Greinacher type is connected with the winding 44 of the aforesaid transformer and includes a series of capacitors 52, 54 and so forth connected between one extremity of winding 44 and terminal 62 and a second series of capacitors 58, 60 and so forth which are connected between other extremities of winding 44 and terminal 62 via a diode 72. From the terminal 62 the output voltage of the circuit is derived.

Diodes 64, 66, 68, 70, 72 and so forth are connected in conventional manner between the two series of capacitors and provide for rectification and multiplication in conventional manner.

It will be appreciated that the operation of the aforesaid oscillating means and rectifying means is conventional per se. In accordance with the invention, there is provided the gating current control means 14 adapted to the technique of the invention and comprising an astable multivibrator, as shown in FIG. 3, connected to terminals A and B.

Terminal A is connected to the center tap 46 of winding 44 whereas terminal B is connected to a center tap 64 of winding 40. The circuit of FIG. 3 comprises two transistors 80 and 82, the transistor 80 comprising a base 84 and emitter 86 and a collector 88, the transistor 82 comprising a base 90 and emitter 92 and a collector 94.

Also comprised in the circuit of FIG. 3 are resistors $R_3$, $R_4$, $R_5$ and $R_6$ connected to the negative terminal 96 of a 1.5 volt battery, the positive terminal 98 of which is connected to the emitters 86 and 92.

The base 84 is connected to resistor $R_5$ and via a capacitor $C_4$ to resistor $R_6$ which is also connected to collector 94. Base 90 is connected to resistor $R_4$ and via a capacitor $C_3$ to resistor $R_3$ which is also connected to collector 88.

The other extremities of resistors $R_3$, $R_4$, $R_5$ and $R_6$ are connected along with the terminal A to the aforesaid terminal 96. Capacitor $C_4$ is, however, connected to terminal B via resistor $R_2$ and capacitor $C_2$.

FIG. 2 is a graph illustrating the technique of employing part of a duty cycle as proposed according to the invention.

In FIG. 2 ordinate 101 represents time and ordinate 102 represents a current magnitude.

It will be seen according to the graph of FIG. 2 that there is generated according to the invention a series of pulses in a time $T_1$ which represents but a part of the overall duty cycle $T_2$. It will be noted hereinafter that the magnitude of the pulses generated as illustrated in FIG. 2 is greater than that that would be necessary to generate the desired high D-C voltage at the output terminal of the aforesaid circuit.

The operation of the circuit of FIG. 1 in conjunction with the technique illustrated in FIG. 2 will be described hereinafter.

FIG. 2 shows that the overall efficiency of oscillating is the one produced in the times $T_1$, but that the entire output power is the continuous output multiplied by the ratio $T_1/T_2$. The time $T_2$ is selected so that the terminal voltage at the cascade output drops under a given load by an amount which is still permissible, and the time $T_1$ is so selected that the desired terminal voltage is reached again at the end of the oscillating-current pulse.

The time $T_1$ is set by appropriate selection of $R_2$ and $C_2$, and the time $T_2$, by appropriate selection of $R_4$ and $R_5$. The oscillator keyed the multivibrator operates in the range of $-30°$ C. to $+60°$ C. with completely uniform pulses.

Operating the oscillator with pulses of high oscillating current offers the additional advantage that it is readily possible to dimension the oscillating transformer that it is magnetically saturated at peak currents. The maximum currents are thereby cut to a value determined by the dimensions of the transformer so that, in case of a temperature-responsive displacement of the operating points of the oscillator transistors, a constant form of the time patterns of the oscillating current and, hence, a constant high-voltage at the output of the high-voltage cascade is nevertheless insured.

Instead of separately or externally controlling the gating the oscillating current of the oscillator by means of the multivibrator of flip-flop circuit, it is also possible to use an electro-mechanical system.

There will now be obvious to those skilled in the art many modifications and variations of the process and apparatus disclosed above. These modifications and variations will not, however, depart from the scope of the invention if defined by the following claim.

What is claimed is:

1. A direct-current converter comprising an oscillator comprising first and second transistors each having an emitter, a collector and a base, a transformer including first and second center-tapped windings and an output winding, a direct-current potential source including first and second terminals, means for connecting said emitters to said first terminal, means for connecting said collectors respectively to the ends of said first center-tapped winding, means for connecting said bases respectively to the ends of said second center-tapped winding, means for connecting the center tap of said first winding and the center tap of said second winding to said second terminal; a gating current control means connected between the center taps of said first and second windings for controlling the voltage applied to said bases, said gating means including an astable multivibrator; and a rectifier means connected to said output winding.

References Cited

UNITED STATES PATENTS

| | | | |
|---|---|---|---|
| 3,012,181 | 12/1961 | Schultz | 321—15 |
| 2,920,259 | 1/1960 | Light | 321—44 |
| 2,619,602 | 11/1952 | Walicer | 321—15 |

LEE T. HIX, *Primary Examiner.*

W. SHOOP, *Assistant Examiner.*

U.S. Cl. X.R.

331—113